US010019141B2

(12) United States Patent
Suzuki et al.

(10) Patent No.: US 10,019,141 B2
(45) Date of Patent: Jul. 10, 2018

(54) INFORMATION PROCESSING APPARATUS, INFORMATION DISPLAY PROGRAM, AND INFORMATION DISPLAY METHOD FOR CONTROLLING A CURSOR POSITION IN A TEXT REGION AND A DISPLAY REGION (71) Applicant: YAHOO JAPAN CORPORATION, Tokyo (JP)

(72) Inventors: Kenji Suzuki, Tokyo (JP); Kazumasa Okabe, Tokyo (JP)

(73) Assignee: YAHOO JAPAN CORPORATION, Tokyo (JP)

(*) Notice: Subject to any disclaimer, the term of this patent is extended or adjusted under 35 U.S.C. 154(b) by 308 days.

(21) Appl. No.: 14/850,371

(22) Filed: Sep. 10, 2015

(65) Prior Publication Data
US 2016/0085409 A1 Mar. 24, 2016

(30) Foreign Application Priority Data
Sep. 19, 2014 (JP) .................................. 2014-190796

(51) Int. Cl.
*G06F 3/0488* (2013.01)
*G06F 3/0484* (2013.01)
*G06F 3/01* (2006.01)

(52) U.S. Cl.
CPC ........ *G06F 3/04842* (2013.01); *G06F 3/0488* (2013.01); *G06F 3/017* (2013.01)

(58) Field of Classification Search
CPC .. G06F 3/017; G06F 3/04812; G06F 3/04842; G06F 3/04847; G06F 3/0486; G06F 3/0488; G06F 3/04886; H04N 1/00381; H04N 1/00392; G06K 9/00335
See application file for complete search history.

(56) References Cited

U.S. PATENT DOCUMENTS

2015/0143273 A1* 5/2015 Bernstein .............. G06F 3/0488
715/767

FOREIGN PATENT DOCUMENTS

JP 2013-218669 A 10/2013
JP 2014-035611 A 2/2014

OTHER PUBLICATIONS

JP 2013-218669 A (ENG translations) published on Oct. 24, 2013.*
Nov. 24, 2015 Office Action issued in Japanese Patent Application No. 2014-190796.

* cited by examiner

*Primary Examiner* — Rinna Yi
(74) *Attorney, Agent, or Firm* — Oliff PLC (57) ABSTRACT An information processing apparatus according to an embodiment includes a moving operation detecting unit and a first display position changing unit. The moving operation detecting unit detects a moving operation for requesting to move a text display region displayed in a display. When the moving operation detecting unit has detected the moving operation, the first display position changing unit moves a display position of the text display region in the display according to the moving operation in a state where a cursor position in the display is maintained.

4 Claims, 9 Drawing Sheets

FIG.9

INFORMATION PROCESSING APPARATUS, INFORMATION DISPLAY PROGRAM, AND INFORMATION DISPLAY METHOD FOR CONTROLLING A CURSOR POSITION IN A TEXT REGION AND A DISPLAY REGION

CROSS-REFERENCE TO RELATED APPLICATION(S)

The present application claims priority to and incorporates by reference the entire contents of Japanese Patent Application No. 2014-190796 filed in Japan on Sep. 19, 2014.

BACKGROUND OF THE INVENTION

1. Field of the Invention

The present invention relates to an information processing apparatus, an information display program, and an information display method.

2. Description of the Related Art

For example, a smartphone and a tablet device have been widely used as an information processing apparatus. For example, the information processing apparatus can move a cursor to the touched position by touching a touch panel on the text displayed on a display with a finger and the like and can select a part of the text by tracing on a display screen of the display with the finger and the like.

As a technique relating to a text edit operation by using the touch panel and the like, a technique for enlarging and displaying a part of the text so that the user can easily touch a desired position has been known. For example, a technique has been known in which intervals between characters are widened and the text is displayed when a tap operation has been received during edition of the text (for example, refer to Japanese Patent Application Laid-open No. 2014-35611 A).

However, since the intervals between the characters are widened and the text is displayed in the related art, places where the text is displayed before/after the tap operation are different from each other. Therefore, it is necessary to look for the text, which is desired to edit by the user, again after the tap operation. Also, there is a possibility that the text desired to edit goes out from the display screen by widening the intervals of the characters and displaying the test in the related art. In this way, the usability has not been necessarily high in the related art.

SUMMARY OF THE INVENTION

An information processing apparatus according to an embodiment includes a moving operation detecting unit and a first display position changing unit. The moving operation detecting unit detects a moving operation for requesting to move a text display region displayed in a display. The first display position changing unit moves a display position of the text display region in the display according to the moving operation in a state where a cursor position in the display is maintained when the moving operation detecting unit has detected the moving operation.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Preferred embodiment (referred to as "embodiment" below) of an information processing apparatus, an information display program, and an information display method according to the present application will be described in detail below with reference to the drawings. The information processing apparatus, the information display program, and the information display method according to the present application are not limited to the embodiment.

1. Cursor Moving Processing

Figure 1:
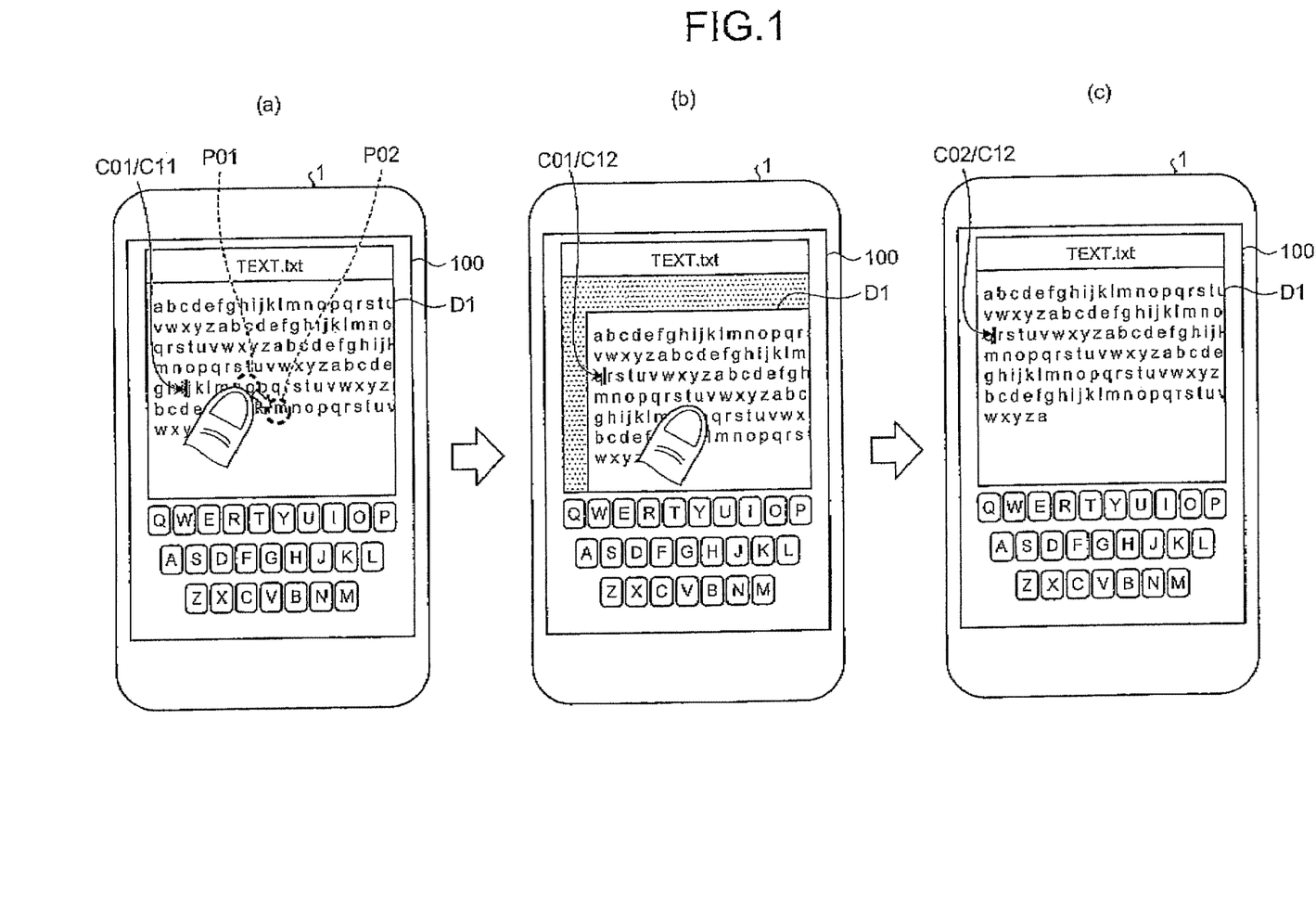
FIG. 1 is an explanatory diagram of exemplary cursor moving processing according to an embodiment.

Exemplary cursor moving processing according to the embodiment will be described with reference to FIG. 1. FIG. 1 is an explanatory diagram of the exemplary cursor moving processing according to the embodiment. The cursor moving processing according to the embodiment is performed by an information processing apparatus 1 illustrated in FIG. 1. The information processing apparatus 1 is, for example, a tablet device and includes a display 100 such as a liquid crystal display. The information processing apparatus 1 employs a touch panel and receives various operations when the display 100 is touched by a finger and the like. When receiving a moving operation for tracing on the display 100 with the finger and the like, the information processing apparatus 1 according to a first embodiment receives the moving operation of the cursor from a user by moving a text display region D1 displayed on the display 100. This point will be described with reference to the example illustrated in FIG. 1.

As illustrated in FIG. 1(*a*), it is assumed that the information processing apparatus 1 start an application which can edit text and the like (here, assumed to be a memo pad application). At this time, the information processing apparatus 1 displays the text in the text display region D1 in the display 100 and displays a cursor (also referred to as a caret) which indicates a position where a character is input. A position where the cursor is displayed is referred to as a cursor position below. For example, the cursor is displayed at a cursor position C01 in the display 100 in FIG. 1(*a*). Also, the position of the cursor in the text display region D1 at this time is a cursor position C11.

In this state, it is assumed that the information processing apparatus 1 receive the moving operation (referred to as a slide operation and a swipe operation) for tracing from an arbitrary position P01 to a position P02 on a display surface (touch panel surface) of the display 100 with the finger and the like from the user. In this case, as illustrated in FIG. 1(b), the information processing apparatus 1 moves a display position of the text display region D1 according to the moving operation in a state where the cursor position C01 in the display 100 is maintained.

Since the display position of the text display region D1 is moved in a state where the cursor position C01 in the display 100 is maintained, the cursor position C01 in the display 100 in FIG. 1(b) is not changed from that in FIG. 1(a). On the other hand, in FIG. 1(a), the cursor position C11 in the text display region D1 is positioned between the third character "i" in the fifth line in the text and the fourth character "j". Whereas, in FIG. 1(b), the cursor position C12 in the text display region D1 is positioned between the first character "q" in the third line of the text and the second character "r".

In the example in FIG. 1, when the user takes off the finger from the display surface, the information processing apparatus 1 returns the text display region D1 to the original display position before the movement in a state where the cursor position C12 in the text display region D1 is maintained.

Since the text display region D1 is returned to the original display position before the movement in a state where the cursor position C12 in the text display region D1 is maintained, a cursor position C02 in the display 100 illustrated in FIG. 1(c) has moved from the cursor position C01 in the display 100 in FIG. 1(b) according to the moving operation. On the other hand, the cursor position C12 in the text display region D1 illustrated in FIG. 1(c) has been positioned between "q" and "r" similarly to the cursor position C12 in the text display region D1 illustrated in FIG. 1(b) and has not moved in the text display region D1.

In this way, the information processing apparatus 1 moves the cursor position in the text display region D1 from the position C11 to the position C12 by moving the display position of the text display region D1 according to the moving operation in a state where the cursor position C01 in the display 100 is maintained. Accordingly, the cursor can be more easily and accurately moved compared with a case where the cursor is moved by directly touching the display surface of the display 100.

Also, the information processing apparatus 1 moves the cursor position in the display 100 from the position C01 to the position C02 by returning the display position of the text display region D1 to the display position before the moving operation in a state where the cursor position C12 in the text display region D1 is maintained. Accordingly, the usability of the information processing apparatus 1 can be further improved.

When the cursor position C12 is positioned on a character at the time when the moving operation has been completed, the information processing apparatus 1 moves the cursor position C12 to a position between the closest characters and adjusts it. For example, when the cursor position C12 is positioned on a side of "q" on "r" at the time when the moving operation has been completed, the information processing apparatus 1 moves the cursor position C12 to a position between "q" and "r". Accordingly, a final cursor position can be arranged between the characters.

2. Structure of Information Processing Apparatus

Figure 2:
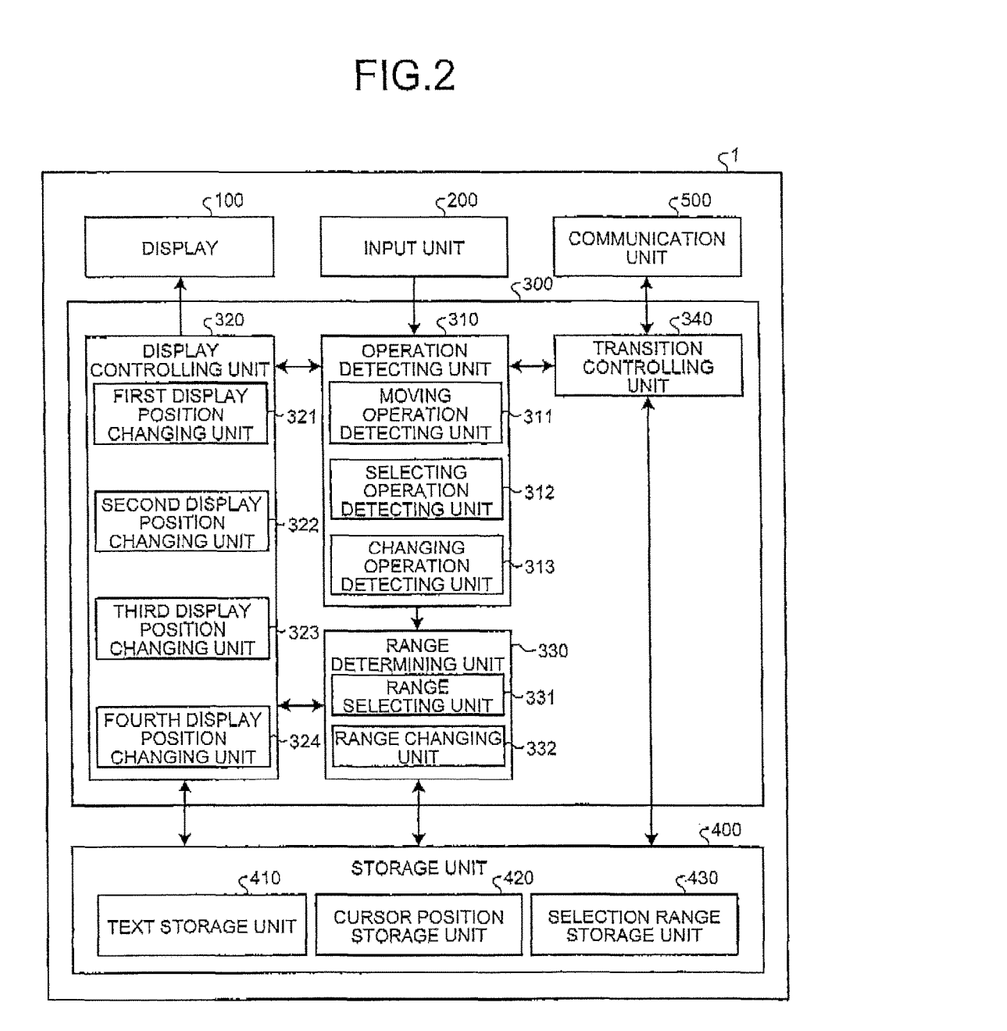
FIG. 2 is a diagram of an exemplary structure of an information processing apparatus according to the embodiment.

Next, the information processing apparatus 1 illustrated in FIG. 1 will be described with reference to FIG. 2. FIG. 2 is a diagram of an exemplary structure of the information processing apparatus 1 according to the embodiment. The information processing apparatus 1 illustrated in FIG. 2 has a touch panel mounted therein. For example, a tablet device, a personal computer (PC), a mobile phone, and a personal digital assistant (PDA) are exemplified as the information processing apparatus 1. As illustrated in FIG. 2, the information processing apparatus 1 includes the display 100, an input unit 200, a control unit 300, a storage unit 400, and a communication unit 300.

The display 100 is a display device to display various information. For example, the display 100 is realized by a liquid crystal display. The input unit 200 is an input device which receives various operations from the user. For example, the input unit 200 is realized by a hard key provided on a side wall and the like of the information processing apparatus 1. The information processing apparatus 1 according to the embodiment includes the touch panel as the input, unit 200. Therefore, the display 100 is integrated with a part of the input unit 200.

The control unit 300 is realized by executing a program stored in an inner storage device (corresponding to an exemplary information processing program), for example, by a central processing unit (CPU) and a micro processing unit (MPU) while having an internal memory such as a random access memory (RAM) as a work region.

The control unit 300 illustrated in FIG. 2 includes an operation detecting unit 310, a display controlling unit 320, a range determining unit 330, and a transition controlling unit 340 and realizes or performs a function and behavior of information processing to be described below. An internal structure of the control unit 300 is not limited to the structure illustrated in FIG. 2 and may be other structure when it performs the information processing to be described.

The operation detecting unit 310 receives various operations from the user via the input unit 200 and detects the kind of the received operations. Specifically, the operation detecting unit 310 detects the moving operation of the cursor, a selecting operation for selecting a part of the text, a changing operation for changing the selected range, a transition operation for requesting the transition to a link destination, and the like. When the operation detecting unit 310 has detected an operation for pressing the display surface (referred to as a tap operation and a touch operation) corresponding to the character to which a link has been set in the display surface of the display 100 by the user, it is assumed that the operation detecting unit 310 have detected the transition operation. The operation detecting unit 310 includes a moving operation detecting unit 311, a selecting operation detecting unit 312, and a changing operation detecting unit 313. Also, the operation detecting unit 310 informs the display controlling unit 320, the range determining unit 330, and the transition controlling unit 340 of the detection result in which various operations have been detected.

The moving operation detecting unit 311 detects the moving operation for requesting to move the text display region D1 displayed in the display 100 by the user. The selecting operation detecting unit 312 detects the selecting operation for requesting to select one or more characters (referred to as a character string below) in the text display region D1. Also, the changing operation detecting unit 313 detects the changing operation for changing an end point or a start point of a selection range in a state where the selection range has been determined.

The display controlling unit 320 controls the display of various information on the display 100 according to various operations detected by the operation detecting unit 310. When the operation detecting unit 310 has detected an operation for instructing to display the text on the display 100, the display controlling unit 320 controls the display 100 to display the text stored in the storage unit 400 in the text display region D1 of the display 100.

When the operation detecting unit 310 has detected any one of the moving operation, the selecting operation, and the changing operation, the display controlling unit 320 moves the display position of the text display region D1 according to the operation. Also, when the operation detected by the operation detecting unit 310 has been terminated, the display controlling unit 320 returns the display position of the text display region D1 to the display position before the movement. Also, when the operations have been terminated, the display controlling unit 320 displays the cursor between the characters which are the closest from the cursor position at the time of terminating the operation. The display controlling unit 320 includes first to fourth display position changing units 321 to 324.

When the moving operation detecting unit 311 has detected the moving operation, the first display position changing unit 321 and the second display position changing unit 322 perform the cursor moving processing. When the selecting operation detecting unit 312 has detected the selecting operation, the third display position changing unit 323 performs the range selecting processing. When the operation detecting unit 310 has detected the changing operation in a state where the selection range has been determined, the fourth display position changing unit 324 performs the range changing processing.

When the operation detecting unit 310 has detected the selecting operation, the range determining unit 330 performs the range selecting processing for determining a part of the text as a selection range according to the movement of the text display region D1 by the display controlling unit 320. Also, when the operation detecting unit 310 has detected the changing operation in a state where the selection range has been determined, the range determining unit 330 performs the range changing processing for changing the selection range according to the movement of the text display region D1 by the display controlling unit 320. The range determining unit 330 includes a range selecting unit 331 which performs the range selecting processing and a range changing unit 332 which performs the range changing processing.

When the character string, to which the link has been set by the display controlling unit 320, has been displayed in the text display region D1 and the operation detecting unit 310 has detected the transition operation to the link, the transition controlling unit 340 obtains information of the link destination and stores the obtained information in the storage unit 400. The transition controlling unit 340 informs the display controlling unit 320 of the obtained result of the information via the operation detecting unit 310. The display controlling unit 320 which has received the notification makes the display 100 display the information to be stored in the storage unit 400 according to the obtained result.

Also, the transition controlling unit 340 functions as a transition limiting unit for limiting the transition to the link while the operation detecting unit 310 has detected one of the moving operation, the selecting operation, and the changing operation. Specifically, even when the operation detecting unit 310 has detected the transition operation while the operation detecting unit 310 has detected one of the moving operation, the selecting operation, and the changing operation, the transition controlling unit 340 does not obtain the information on the link destination.

Next, the storage unit 400 is realized by the storage device, for example, a semiconductor memory device such as a RAM and a flash memory. The storage unit 400 stores, for example, text data, image data, and the cursor position displayed on the display 100 by the display controlling unit 320 and the selection range determined by the range determining unit 330. The storage unit 400 includes a text storage unit 410, a cursor position storage unit 420, and a selection range storage unit 430.

The text storage unit 410 stores the text data displayed on the display 100 by the display controlling unit 320. The cursor position storage unit 420 stores the cursor position displayed on the display 100 by the display controlling unit 320 by corresponding it to the display 100 and the text display region D1. The selection range storage unit 430 stores the start point and the end point of the selection range determined by the range determining unit 330.

The communication unit 500 is realized, for example, by a network interface card (NIC) and a communication circuit. The communication unit 500 is wirelessly/wiredly connected to a network (not shown) and transmits/receives the information to/from an information processing apparatus (not shown) and the like.

3. Description on Cursor Position

Figure 3A:
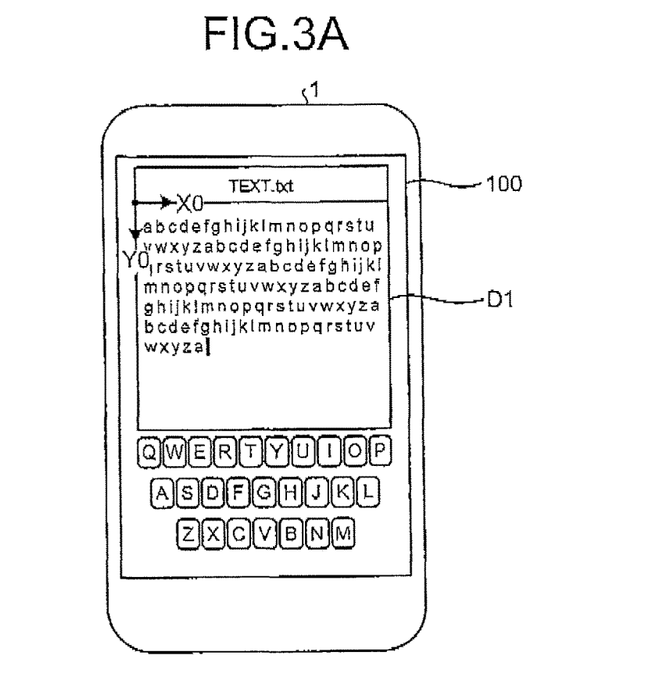
FIG. 3 is a diagram of an exemplary screen displayed by the information processing apparatus according to the embodiment.
Figure 3B:
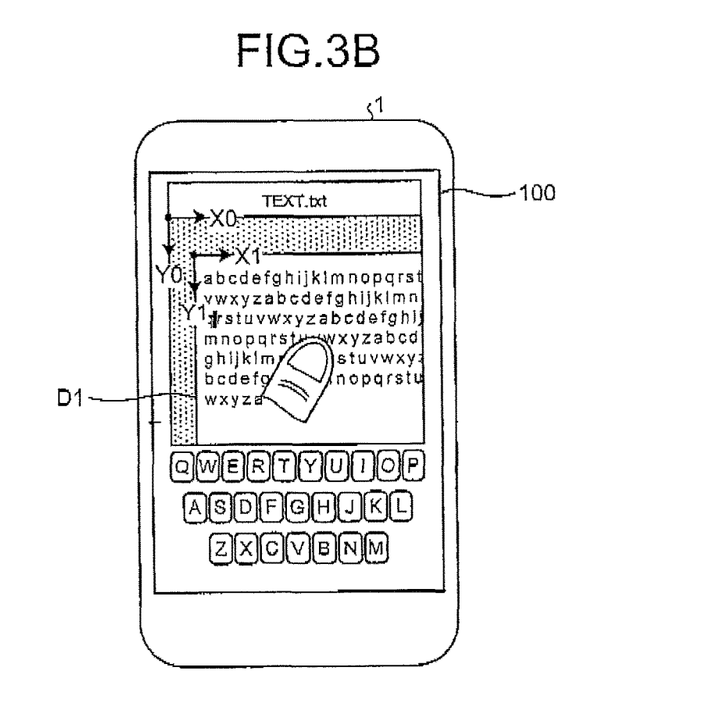
FIG. 3B is a diagram of an exemplary screen displayed by the information processing apparatus according to the embodiment.

The cursor position in the display 100 and the cursor position in the text display region D1 will be described with reference to FIGS. 3A and 3B. FIGS. 3A and 3B are diagrams of an exemplary screen displayed by the information processing apparatus 1 according to the embodiment.

As illustrated in FIG. 3A, a coordinate system, which has the upper left corner of the text display region D1 in a case where the whole region of the text display region D1 is displayed on the display 100 as the origin, the horizontal direction of the display 100 as an X0 axis, and the vertical direction as a Y0 axis, is referred to as a display coordinate system. Also, as illustrated in FIG. 3B, a coordinate system which has the upper left corner of the text display region D1 as the origin, the horizontal direction of the text display region D1 as an X1 axis, and the vertical direction as a Y1 axis, is referred to as a region coordinate system. The display coordinate system is a fixed coordinate system which does not move relative to the display 100, and the region coordinate system is a move coordinate system which moves relative to the display 100 according to the movement of the text display region D1. The cursor position in the display 100 is a position expressed by the display coordinate system, and the cursor position in the text display region D1 is a position expressed by the region coordinate system.

Next, the cursor position in the cursor moving processing will be described by using the display coordinate system and the region coordinate system with reference to FIG. 1. As illustrated in FIG. 1(a), before the moving operation detecting unit 311 detects the moving operation, the cursor position storage unit 420 of the storage unit 400 stores the cursor position in the display 100 as a position C01 (X01 and Y01) expressed by the display coordinate system. Also, the cursor position storage unit 420 stores the cursor position in the text display region D1 as a position C11 (X11 and Y11) expressed by the region coordinate system. Before the moving operation detecting unit 311 detects the moving operation, the origin of the display coordinate system coincides with that of the region coordinate system. Therefore, the position (X01 and Y01) and the position (X11 and Y11) are the same.

Subsequently, as illustrated in FIG. 1(b), a case will be described where the first display position changing unit 321 moves the text display region D1 from a position P01 to a position P02. While moving the text display region D1, the first display position changing unit 321 displays the cursor on the display 100 based on the cursor position C01 in the display 100 before moving the text display region D1. Also, the first display position changing unit 321 calculates the cursor position C12 in the text display region D1 according to the moving amount of the text display region D1 and stores it in the cursor position storage unit 420. In the example in FIG. 1(b), the cursor position storage unit 420 stores a position (X12 and Y12) expressed by the region coordinate system as the cursor position C12 in the text display region D1. Since the first display position changing unit 321 has moved the text display region D1, the position (X01 and Y01) is different from the position (X12 and Y12). Accordingly, the cursor in the text display region D1 moves from the position C11 to the position C12.

As illustrated in FIG. 1(c), a case will be described where the second display position changing unit 322 returns the text display region D1 to the display position before the moving operation. In this case, the second display position changing unit 322 makes the cursor position storage unit 420 store the cursor position C12 in the text display region D1 as the cursor position C02 in the display 100. The cursor position storage unit 420 stores the position (X12 and Y12) expressed by the display coordinate system as the cursor position C02 in the display 100. Also, the second display position changing unit 322 returns the text display region D1 to the display position before the moving operation and displays the cursor at the cursor position C02 in the display 100. Accordingly, the cursor in the display 100 moves from the position C01 to the position C02.

In this way, in the cursor moving processing, when the moving operation detecting unit 311 has detected the moving operation, the first display position changing unit 321 moves the display position of the text display region D1 in the display 100 according to the moving operation in a state where the cursor position in the display 100 is maintained. At this time, the first display position changing unit 321 calculates the cursor position in the text display region D1 and stores the calculated cursor position in the storage unit 400. Subsequently, when the moving operation has been terminated, the second display position changing unit 322 returns the display position of the text display region D1 in the display 100 to the display position before the movement by the first display position changing unit 321 in a state where the cursor position C12 in the text display region D1 is maintained. That is, when the moving operation has been terminated, the second display position changing unit 322 displays the text display region D1 in the display 100, and the cursor position in the text display region D1 stored by the storage unit 400 is displayed as the cursor position in the display 100.

It is preferable that the moving operation detecting unit 311 of the operation detecting unit 310 detect that the moving operation has been terminated and inform the display controlling unit 320 of that. Alternatively, while the moving operation detecting unit 311 has detected the moving operation, the operation detecting unit 310 informs that the moving operation has been detected. When the notification is not received, the display controlling unit 320 may determine that the moving operation has been terminated. Also, regarding the start and the end of the moving operation, it is preferable that the moving operation start when the finger of the user touches the display surface of the display 100 and that the moving operation end when the finger of the user is separated from the display surface. Alternatively, the moving operation may start or end when a predetermined operation such as the touch operation has been received from the user.

4. Range Selecting Processing

Subsequently, exemplary range selecting processing will be described as another processing performed by the information processing apparatus 1. In the range selecting processing, first, when the operation detecting unit 310 has detected the selecting operation, the range selecting unit 331 sets the cursor position in the display 100 before moving the text display region D1 as a start point of a range to be selected according to the selecting operation. Next, the third display position changing unit 323 moves the display position of the text display region D1 in the display 100 according to the selecting operation in a state where the cursor position in the display 100 is maintained. The range selecting unit 331 assumes a range, which has the cursor position in the text display region D1 of a case where the display position of the text display region D1 is moved according to the selecting operation as an end point, as the selection range.

Figure 4:
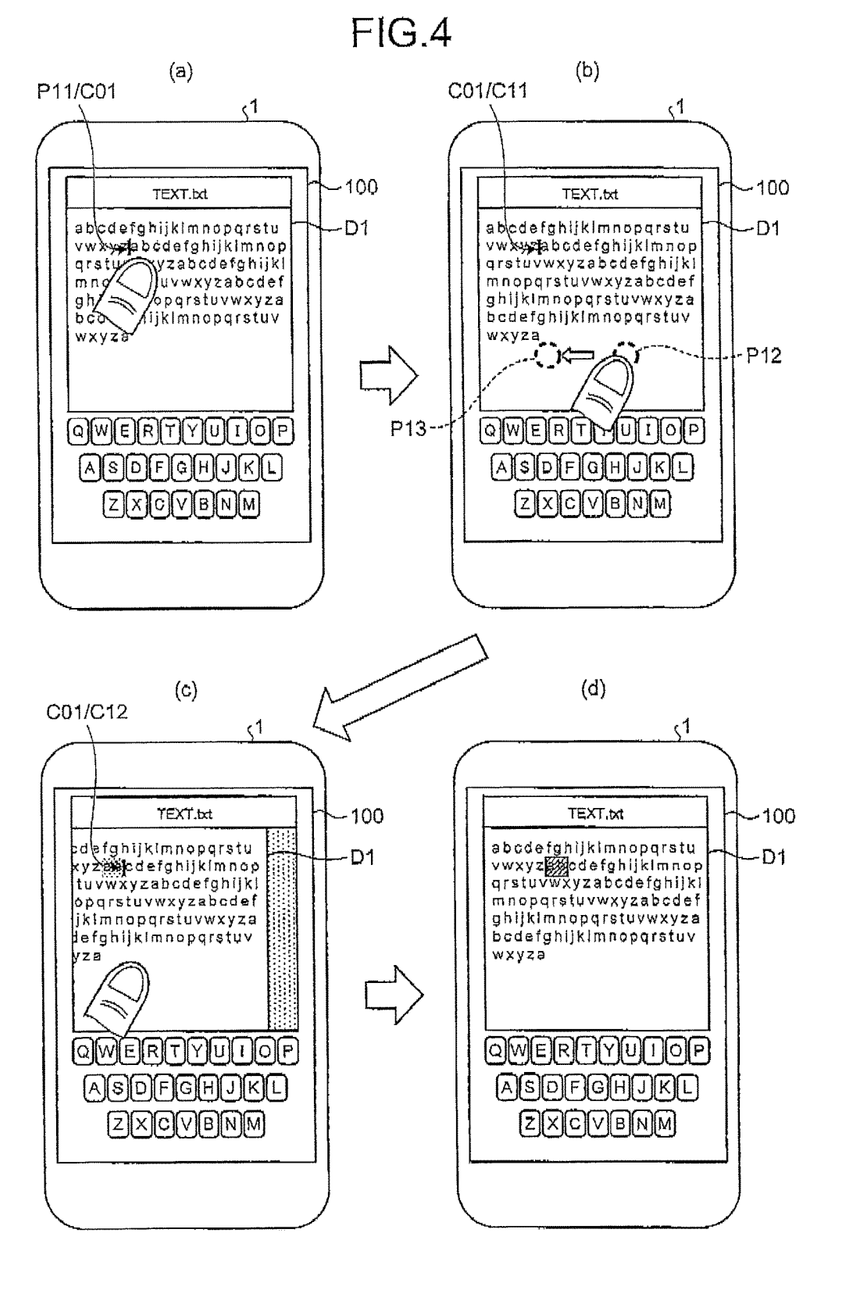
FIG. 4 is an explanatory diagram of exemplary range selecting processing according to the embodiment.

Next, the range selecting processing will be described in detail with reference to FIG. 4. FIG. 4 is an explanatory diagram of exemplary range selecting processing according to the embodiment.

As illustrated in FIG. 4(a), it is assumed that the information processing apparatus 1 start an application which can select the text and the like (here, assumed to be a memo pad application similarly to FIG. 1). In this state, it is assumed that the operation detecting unit 310 receive an operation for touching a position P11 on the display surface of the display 100 from the user. In this case, the selecting operation detecting unit 312 detects a selection starting operation. When the selecting operation detecting unit 312 detects the selection starting operation, the range selecting unit 331 makes the selection range storage unit 430 store the touch position P11 as a start point of the range to be selected. Also, the third display position changing unit 323 assumes the touch position P11 as the cursor position C01 in the display 100.

Next, as illustrated in FIG. 4(b), it is assumed that the operation detecting unit 310 receive an operation for tracing from the arbitrary position P12 to a position P13 on the display surface of the display 100 with the finger and the like. In this case, the selecting operation detecting unit 312 detects the selecting operation. When the selecting operation detecting unit 312 detects the selecting operation, the third display position changing unit 323 moves the display position of the text display region D1 according to the selecting operation in a state where the cursor position C01 in the display 100 is maintained.

The cursor position C01 in the display 100 in FIG. 4(c) is not changed from that in FIG. 4(b). On the other hand, in FIG. 4(b), the cursor position C11 in the text display region D1 is positioned between "z" and "a" in the second line from the top of the text. Whereas, in FIG. 4(c), the cursor position C12 in the text display region D1 is positioned between "b" and "c" in the second line from the top.

In the example illustrated in FIG. 4, the third display position changing unit 323 presents a temporary selection range, in a case where the cursor position C12 in the text display region D1 is assumed to be a temporary end point of the selection range, to the user by making a background color of the character string displayed in the temporary selection range different from a background color of the other character string.

When the selecting operation has been terminated, the range selecting unit 331 makes the selection range storage unit 430 store the cursor position C12 in the text display region D1 stored by the cursor position storage unit 420 as the end point of the selection range. The range selecting unit 331 determines the selection range having the touch position P11 by the user as the start point and the cursor position C12 in the text display region D1 as the end point. The range selecting unit 331 informs the third display position changing unit 323 of the determined selection range.

When receiving a notification regarding the selection range from the range selecting unit 331, the third display position changing unit 323 highlights the background color of the character string displayed in the selection range by making it different from that of the other character string. When the temporary selection range has been presented to the user, the background color of the character string displayed in the temporary selection range may be different from that of the character string displayed in the selection range.

Also, here, as illustrated in FIG. 4(*d*), when the user takes off the finger from the display surface, the information processing apparatus 1 returns the text display region D1 to the original display position in a state where the character string displayed in the selection range in the text display region D1 has been highlighted.

The selecting operation detecting unit 312 may detect the end of the selecting operation according to that the user takes off the finger from the display surface when detecting the selecting operation. Also, when detecting the selecting operation in a case where the finger of the user stops at a certain position without moving for a predetermined time, the selecting operation detecting unit 312 may detect the end of the selecting operation. In this case, when the finger of the user has started to move again, the selecting operation detecting unit 312 may detect the restart of the selecting operation.

When the cursor position C12 is positioned on a character at the time when the selecting operation has been terminated, the third display position changing unit 323 may adjust the cursor position C12 by moving it to a position between the closest characters, and the range selecting unit 331 may assume the adjusted cursor position C12 as the end point of the selection range. Also, when the third display position changing unit 323 does not adjust the cursor position, the range selecting unit 331 may assume the character on which the cursor position C12 is positioned as the end point of the selection range.

Also, in the range selecting processing illustrated in FIG. 4, when receiving the operation for touching the display surface from the user, the selecting operation detecting unit 312 detects the selection starting operation. However, the detection of the selection starting operation by the selecting operation detecting unit 312 is not limited to this. For example, when receiving an operation for pressing the display surface for a certain time (referred to as a long pressing operation and a long tap operation) from the user or when receiving the touch operation for a predetermined number of times, the selecting operation detecting unit 312 may detect the selection starting operation.

Also, in the range selecting processing illustrated in FIG. 4, the touch position P11 where the user has touched has been assumed to be the start point of the selection range. However, the start point of the selection range is not limited to this. For example, the cursor position displayed in the display 100 in a case where the selecting operation detecting unit 312 has detected the selection starting operation may be the start point. Alternatively, the start point of the selection range may be determined by performing the cursor moving processing after the selecting operation detecting unit 312 has detected the selection starting operation.

5. Range Changing Processing

Subsequently, exemplary range changing processing will be described as another processing performed by the information processing apparatus 1. In the range changing processing, first, when the operation detecting unit 310 has detected the changing operation in a state where the selection range has been selected, the range selecting unit 331 determines whether either one of the end point or the start point is changed according to the changing operation. Next, the fourth display position changing unit 324 moves the display position of the text display region D1 in the display 100 according to the changing operation in a state where the cursor position in the display 100 and another one of the end point or the start point of the selection range are maintained. The range changing unit 332 changes the selection range while having the position of one of the start point or the end point in the text display region D1 at the time of moving the display position of the text display region D1 according to the changing operation as a position of one end of the selection range.

Figure 5:
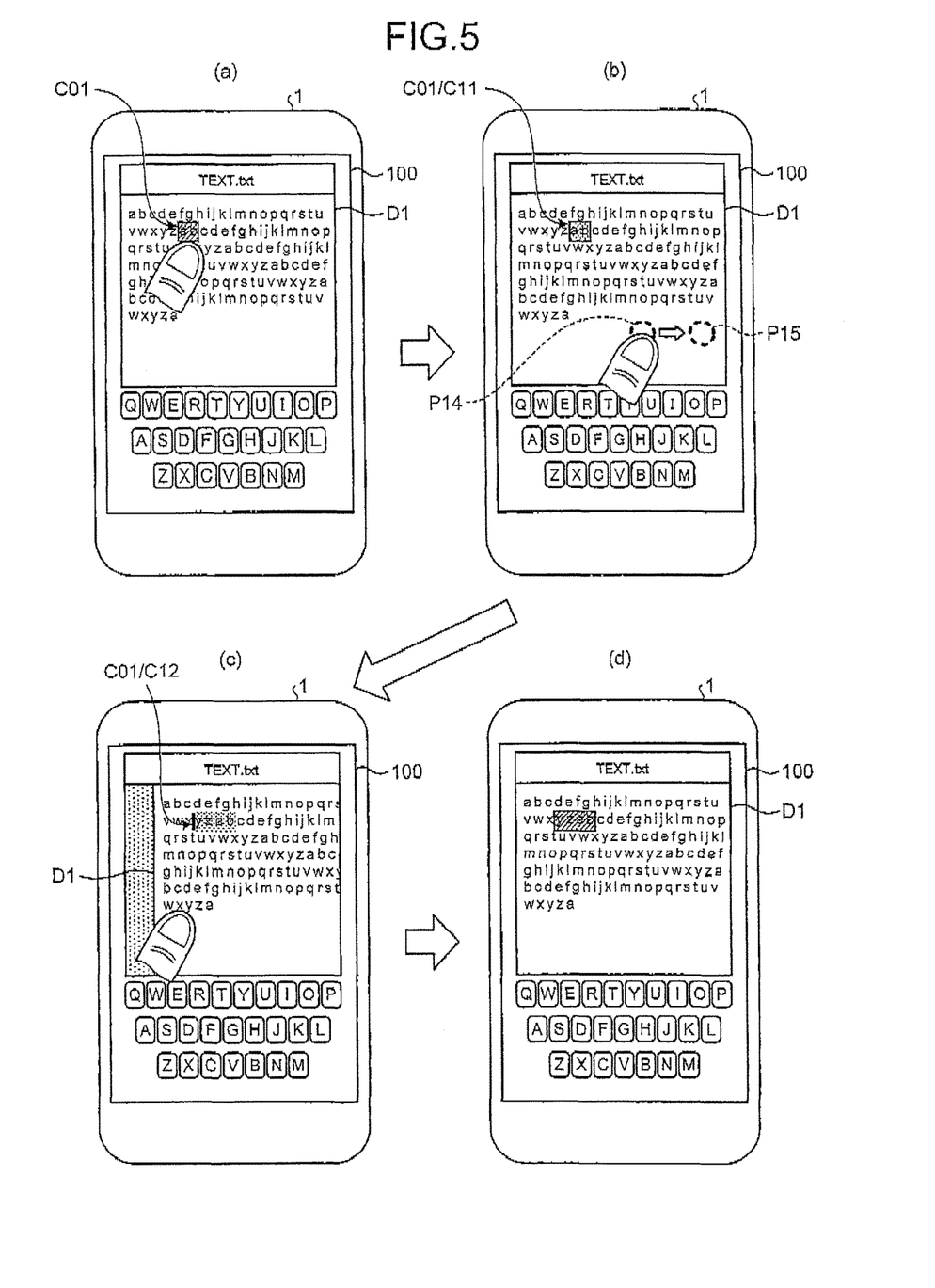
FIG. 5 is an explanatory diagram of exemplary range changing processing according to the embodiment.

The range changing processing will be described in detail with reference to FIG. 5. FIG. 5 is an explanatory diagram of exemplary range changing processing according to the embodiment. To simplify the description, a case will be described below where the changing operation detecting unit 313 detects the changing operation for changing the start point of the selection range.

As illustrated in FIG. 5(*a*), it is assumed that the information processing apparatus 1 have selected the character string which is a part of the text. That is, it is assumed that the range selecting unit 331 have determined the selection range and that the selection range storage unit 430 have stored the start point and the end point of the selection range. In this state, it is assumed that the operation detecting unit 310 have received an operation for touching the start point of the selection range on the display surface of the display 100 from the user. In this case, the changing operation detecting unit 313 detects a change starting operation for starting to change the start point of the selection range. When the changing operation detecting unit 313 detects the change starting operation, the fourth display position changing unit 324 assumes the start point of the selection range as the cursor position C01 in the display 100.

Next, as illustrated in FIG. 5(*b*), it is assumed that the operation detecting unit 310 receive an operation for tracing from an arbitrary position P14 to a position P15 on the display surface of the display 100 with the finger and the like. In this case, the changing operation detecting unit 313 detects the changing operation. When the changing operation detecting unit 313 detects the selecting operation, the fourth display position changing unit 324 moves the display position of the text display region D1 according to the selecting operation in a state where the cursor position C01 in the display 100 is maintained. At this time, the fourth display position changing unit 324 moves and displays the end point of the selection range according to the movement of the text display region D1.

The cursor position C01 in the display 100 in FIG. 5(*c*) is not changed from that in FIG. 5(*b*). On the other hand, in FIG. 5(*b*), the cursor position C11 in the text display region D1 is positioned between "z" and "a" in the second line from the top of the text. Whereas, in FIG. 5(c), the cursor position C12 in the text display region D1 is positioned between "x" and "y" in the second line from the top.

In the example illustrated in FIG. 5(b), when the changing operation detecting unit 313 detects the change starting operation, the fourth display position changing unit 324 highlights the selection range in a color different from that of the highlight illustrated in FIG. 5(a). Also, as illustrated in FIG. 5(c), when the cursor position in the text display region D1 has been moved, a temporary selection range in a case where the cursor position is assumed to be a temporary start point of the selection range is presented to the user by making the background color of the character string displayed in the temporary selection range different from that of the other character string.

When the changing operation has been terminated, the range changing unit 332 makes the selection range storage unit 430 store the cursor position C12 in the text display region D1 stored by the cursor position storage unit 420 as the start point of the selection range. The range changing unit 332 changes the selection range by assuming that the end point of the selection range stored in the selection range storage unit 430 is the end point of the changed selection range and that the cursor position C12 in the text display region D1 is the start point after the change. The range changing unit 332 informs the fourth display position changing unit 324 of the changed selection range.

As illustrated in FIG. 5(d), when receiving the notification of the change of the selection range from the range changing unit 332, the fourth display position changing unit 324 highlights the background color of the character string displayed in the changed selection range by making it different from that of the other character string.

Here, as illustrated in FIG. 5(d), when the user takes off the finger from the display surface, the information processing apparatus 1 returns the text display region D1 to the original display position in a state where the character string displayed in the selection range in the text display region D1 has been highlighted. The end of the change starting operation and that of the changing operation may be detected in a way similar to the range selecting processing.

Also, in the range changing processing illustrated in FIG. 5, it is determined whether either one of the end point or the start point is changed by touching the end point or the start point of the selection range. In addition to this, for example. It may be determined whether either one of the end point or the start point of the selection range is changed according to a moving direction of the text display region D1 which moves according to the changing operation.

When the cursor position C12 is positioned on a character when the selecting operation has been terminated, the fourth display position changing unit 324 may adjust the cursor position C12 by moving it between the closest characters, and the range changing unit 332 may change the selection range by assuming the adjusted cursor position C12 as the changed start point or end point. Also, when the fourth display position changing unit 324 does not adjust the cursor position, the range changing unit 332 may change the selection range by assuming the character on which the cursor position C12 is positioned as the changed start point or end point.

6. Procedure of Processing

Figure 6:
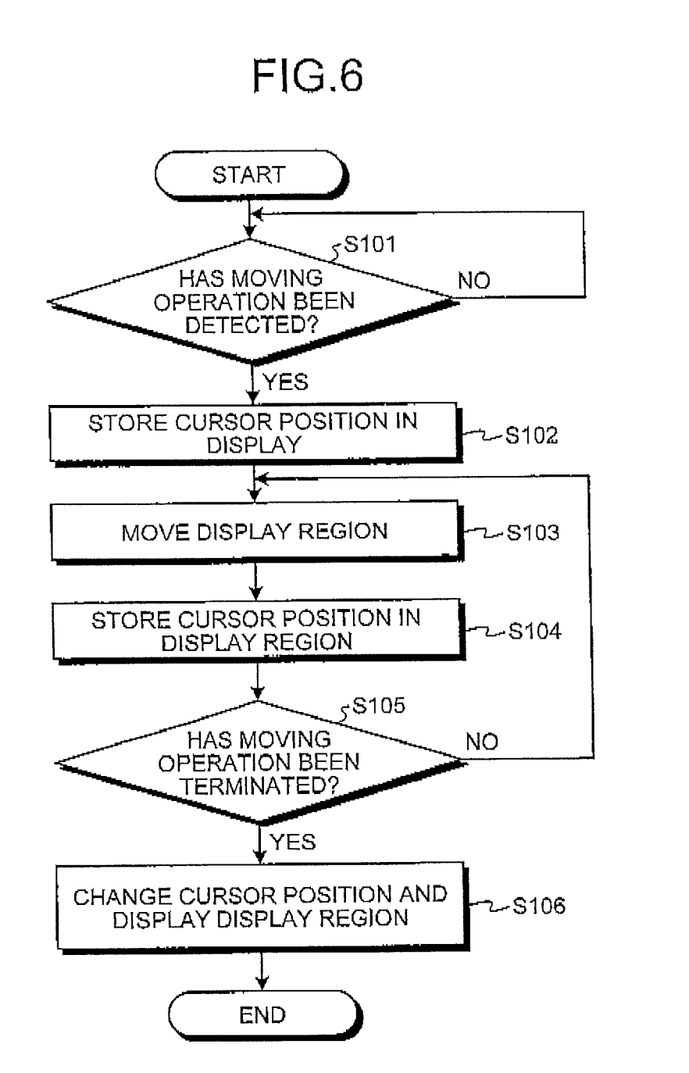
FIG. 6 is a flowchart of an exemplary cursor moving processing procedure according to the embodiment.

Next, a procedure of each processing according to the embodiment will be described with reference to FIGS. 6 to 8. First, a procedure of the cursor moving processing according to the embodiment will be described with reference to FIG. 6. FIG. 6 is a flowchart of an exemplary cursor moving processing procedure according to the embodiment.

As illustrated in FIG. 6, the operation detecting unit 310 of the information processing apparatus 1 determines whether the moving operation has been detected (step S101). When the moving operation has not been detected (step S101, No), the procedure returns to step S101, and the detection of the moving operation is waited for. When the moving operation has been detected (step S101, Yes), the storage unit 400 stores the cursor position C01 in the display 100 (step S102).

Subsequently, the display controlling unit 320 moves the text display region D1 according to the moving operation (step S103). The storage unit 400 stores the cursor position C12 in the text display region D1 (step S104). The operation detecting unit 310 determines whether the moving operation has been terminated (step S105). When the moving operation has not been terminated (step S105, No), the procedure returns to step S103. On the other hand, when the moving operation has been terminated (step S105, Yes), the display controlling unit 320 changes the cursor position C01 in the display 100 to the cursor position C12 in the text display region D1 and returns the text display region D1 to the display position before the moving operation and displays the text display region D1 (step S106).

Next, a procedure of the range selecting processing according to the embodiment will be described with reference to FIG. 7. FIG. 7 is a flowchart of an exemplary range selecting processing procedure according to the embodiment.

Figure 7:
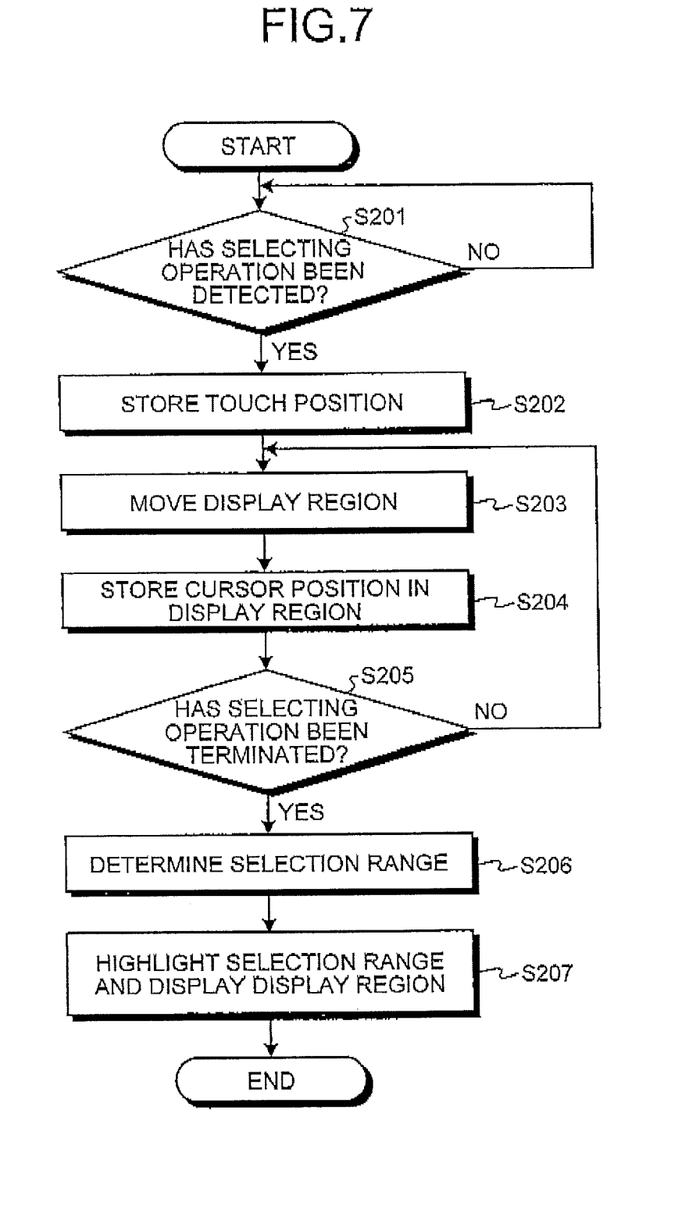
FIG. 7 is a flowchart of an exemplary range selecting processing procedure according to the embodiment.

As illustrated in FIG. 7, the operation detecting unit 310 determines whether the selecting operation has been detected (step S201). When the selecting operation has not been detected (step S201, No), the procedure returns to step S201, and the detection of the selecting operation is waited for. When the selecting operation has been detected (step S201, Yes), the storage unit 400 stores the touch position P11 as the start point of the selection range (step S202).

Subsequently, the display controlling unit 320 moves the text display region D1 according to the selecting operation (step S203). The storage unit 400 stores the cursor position C12 in the text display region D1 (step S204). The operation detecting unit 310 determines whether the selecting operation has been terminated (step S205). When the selecting operation has not been terminated (step S205, No), the procedure returns to step S203. On the other hand, when the selecting operation has been terminated (step S205, Yes), the range determining unit 330 determines the selection range while having the touch position P11 as the start point and the cursor position C12 in the text display region D1 as the end point (step S206). The display controlling unit 320 highlights the selection range, returns the text display region D1 to the display position before the moving operation, and displays the text display region D1 (step S207).

Next, a procedure of the range changing processing according to the embodiment will be described with reference to FIG. 8. FIG. 8 is a flowchart of an exemplary range changing processing procedure according to the embodiment.

Figure 8:
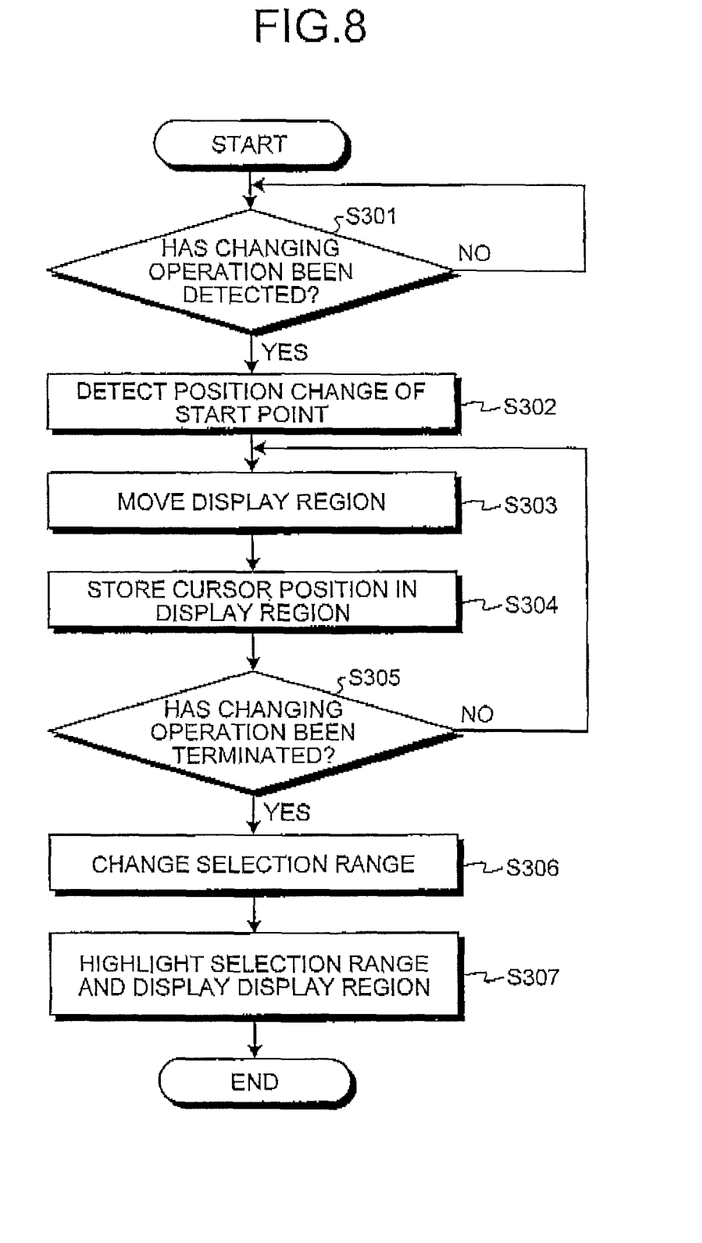
FIG. 8 is a flowchart of an exemplary range changing processing procedure according to the embodiment.

As illustrated in FIG. 8, the operation detecting unit 310 determines whether the changing operation has been detected (step S301). When the changing operation has not been detected (step S301, No), the procedure returns to step S301, and the detection of the changing operation is waited for. When the changing operation has been detected (step S301, Yes), the operation detecting unit 310 detects the change of the start point or the end point of the selection range (step S302). In step S302, the change of the start point is detected.

Subsequently, the display controlling unit 320 moves the text display region D1 according to the changing operation (step S303). The storage unit 400 stores the cursor position C12 in the text display region D1 (step S304). The operation detecting unit 310 determines whether the changing operation has been terminated (step S305). When the changing operation has not been terminated (step S305, No), the procedure returns to step S303. On the other hand, when the changing operation has been terminated (step S305, Yes), the range determining unit 330 changes the selection range having the cursor position C12 in the text display region D1 as the start point (step S306). The display controlling unit 320 highlights the changed selection range, returns the text display region D1 to the display position before the moving operation, and displays the text display region D1 (step S307).

7. The Others

In the embodiment described above, the cursor moving processing and the range selecting processing have been described as processing performed in a state where the different applications are started for each processing. However, they are not limited to this. For example, in a state where a single application is started, both the cursor moving processing and the range selecting processing may be performed. In this case, the processing may be selected according to the operation by the user. For example, the cursor moving processing is performed when the touch operation has been performed once, and the range selecting processing is performed when the touch operation has been performed twice or when the display surface is pressed for a long time.

In the embodiment described above, when the operation detected by the operation detecting unit 310 has been terminated, the display controlling unit 320 displays the cursor between the characters closest to the cursor position at the time of terminating the operation. However, the procedure is not limited to this. For example, when the cursor is displayed on the character without positioning the cursor between the characters, the display controlling unit 320 can display the cursor on the character which is the closest from the cursor position. As an example in which the cursor is displayed on the character, a case where the character displayed in the text display region D1 is overwritten and is replaced to a new character is exemplified.

Also, for example, the display controlling unit 320 may display the cursor on the display surface in the display 100 so that the cursor position sequentially moves between the characters according to the operation detected by the operation detecting unit 310. Specifically, even when the display position of the text display region D1 moves, the display controlling unit 320 displays the cursor between the characters which are the closest from the cursor position in the display 100 before the movement. Alternatively, for example, the display controlling unit 320 may move the display position of the text display region D1 so that the cursor position in the display 100 is positioned between the characters. Specifically, for example, the display controlling unit 320 moves the display position of the text display region D1 by a unit of the character displayed in the text display region D1. Accordingly, even when the display position of the text display region D1 is moving, the cursor can be displayed between the characters. A timing to terminate the operation can be appropriately found.

In this case, the cursor position in the display 100 during the movement of the text display region D1 is changed within a predetermined range while having the cursor position before the movement as the center. However, the predetermined range is, for example, a range having a distance from the center of the character to a space between the character and an adjacent character as a radius. In the predetermined range, the cursor position is not substantially moved according to the movement of the text display region D1. That is, in this case, the cursor position in the display 100 is substantially maintained when the display position of the text display region D1 is moving.

In this way, when the position where the cursor is displayed in the text display region D1 has been previously determined, for example, at a position between the characters, the display controlling unit 320 displays the cursor at a position which is the closest from the cursor position at the time of terminating the operation detected by the operation detecting unit 310 from among the positions where the cursor has been previously determined to be displayed. Also, when the cursor is displayed in the display 100 when the text display region D1 is moving, the display controlling unit 320 displays the cursor at a position closest to the cursor position according to the movement of the text display region D1 from among the positions where the cursor has been previously determined to be displayed.

Also, in the embodiment, the information processing apparatus 1 may highlight the cursor which is displayed when the display controlling unit 320 moves the display position of the text display region D1. For example, only when the display position of the text display region D1 is moving, the display color of the cursor may be different, the cursor may be displayed larger and may be flickered. Accordingly, the cursor position in the text display region D1 can be clearly presented to the user.

In the embodiment, when each operation is terminated, the display controlling unit 320 returns the display position of the text display region D1 to the display position before the movement. However, the procedure is not limited to this. For example, when the operation detecting unit 310 has detected a deciding operation for deciding the operations by the user, the display controlling unit 320 may return the display position of the text display region D1 to the display position before the movement. As the deciding operation for deciding the operations, the touch operation for touching the display surface and an operation for tracing the display surface by the user so as to return the text display region D1 to the original display position can be exemplified.

In the embodiment, the operation for tracing the display surface once by the user is detected as the operation. However, the operation for tracing the display surface for a plurality of times by the user may be detected as the operation. In this case, in a case where the operation for tracing is performed again in a predetermined time even when the user takes off the finger from the display surface, the operation may be continuously detected. Also, until the user takes off the finger from the display surface for a predetermined time or until the user performs the deciding operation, the operations may be continuously detected.

In the embodiment, the operation detecting unit 310 detects the selection starting operation and the change starting operation. However, the structure is not limited to this. For example, the information processing apparatus 1 may start the range selecting processing by detecting the range selecting operation without detecting the selection starting operation.

In the embodiment, the transition controlling unit 340 obtains the information from the other information processing apparatus which is the link destination via the communication unit 500. However, the structure is not limited to this. For example, the link destination may be the information processing apparatus 1 itself. Even in this case, the transition controlling unit 340 limits the transition when the operations are detected.

Also, for example, in a case where the cursor goes out from the text display region D1 when the display controlling unit 320 moves the display position of the text display region D1, it is preferable that the cursor be positioned in the text display region D1. For example, in a state where the cursor position in the text display region D1 immediately before the cursor goes out from the text display region D1 is maintained, the display controlling unit 320 may move the display position of the text display region D1. Also, when the text display region D1 goes out from the display 100, it is preferable that the display controlling unit 320 do not move the display position of the text display region D1 any more.

Also, in the embodiment described above, the touch panel has been used as the input unit 200. However, the input unit 200 is not limited to this. It is preferable that the input unit 200 be an input device which can move the cursor and select the range. The input device is, for example, a touch pad and a pen tablet.

8. Hardware Configuration

Figure 9:
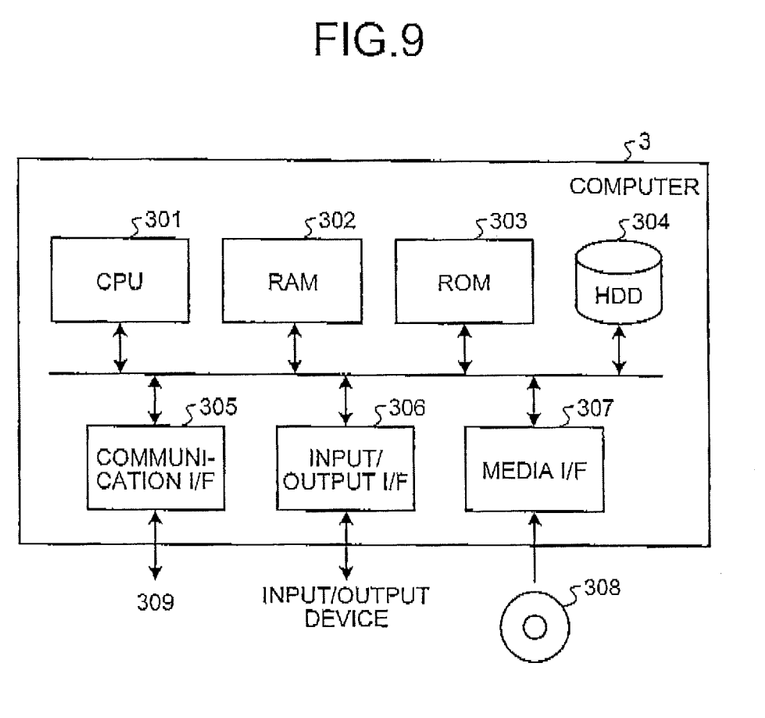
FIG. 9 is a hardware configuration diagram of an exemplary computer which realizes a function of the information processing apparatus.

The information processing apparatus 1 according to the embodiment is realized, for example, by a computer 3 having a structure illustrated in FIG. 9. FIG. 9 is a hardware configuration diagram of an exemplary computer 3 which realizes an information processing function. The computer 3 includes a CPU 301, a RAM 302, a read only memory (ROM) 303, a hard disk drive (HDD) 304, a communication interface (I/F) 305, an input/output interface (I/F) 306, and a media interface (I/F) 307.

The CPU 301 operates based on a program stored in the ROM 303 or the HDD 304 and controls each unit. The ROM 303 stores a boot program executed by the CPU 301 at the time of starting the computer 3 and a program which depends on hardware of the computer 3.

The HDD 304 stores the program executed by the CPU 301, data used by the program, and the like. The communication interface 305 receives data from the other apparatus via a communication line 309 and transmits it to the CPU 301. Also, the communication interface 305 transmits the data generate by the CPU 301 to the other apparatus via the communication line 309.

The CPU 301 controls an output device such as a display and a printer and an input device such as a keyboard and a mouse via the input/output interface 306. The CPU 301 obtains the data from the input device via the input/output interface 306. Also, the CPU 301 outputs the generated data to the output device via the input/output interface 306.

The media interface 307 reads a program or data stored in a recording medium 308 and provides it to the CPU 301 via the RAM 302. The CPU 301 loads the program from the recording medium 308 to the RAM 302 via the media interface 307 and executes the loaded program. The recording medium 308 is, for example, an optical recording medium such as a digital versatile disc (DVD) and a phase change rewritable disk (PD), a magneto-optical recording medium such as a magneto-optical disk (MO), a tape medium, a magnetic recording medium, or a semiconductor memory.

When the computer 3 functions as the information processing apparatus 1 according to the embodiment, the CPU 301 of the computer 3 realizes each function of the operation detecting unit 310, the display controlling unit 320, the range determining unit 330, and the transition controlling unit 340 of the control unit 300 by executing the program which has been loaded to the RAM 302. Also, data in the storage unit 400 is stored in the HDD 304.

The CPU 301 of the computer 3 reads these programs from the recording medium 300 and executes it. However, as another example, the CPU 301 may obtain the program from the other apparatus via the communication line 309.

9. Effect

In this way, the information processing apparatus 1 according to the embodiment detects the moving operation for requesting to move the text display region D1 displayed in the display 100 by the moving operation detecting unit 311. When the moving operation detecting unit 311 has detected the moving operation, the information processing apparatus 1 moves the display position of the text display region D1 in the display 100 according to the moving operation by the first display position changing unit 321 in a state where the cursor position C01 in the display 100 is maintained. Accordingly, the information processing apparatus 1 can easily and accurately move the cursor in the text display region D1, and the usability of the information processing apparatus 1 is improved.

Also, the information processing apparatus 1 according to the embodiment has the second display position changing unit 322. When the moving operation has been terminated, the second display position changing unit 322 returns the display position of the text display region D1 in the display 100 to the display position before being moved by the first display position changing unit 321 in a state where the cursor position C12 in the text display region D1 is maintained. Accordingly, the information processing apparatus 1 can easily and accurately move the cursor of the display 100, and the usability of the information processing apparatus 1 is improved.

Also, the information processing apparatus 1 according to the embodiment detects the selecting operation for requesting to select one or more characters in the text display region D1 by the selecting operation detecting unit 312. When the selecting operation detecting unit 312 has detected the selecting operation, the third display position changing unit 323 moves the display position of the text display region D1 in the display 100 according to the selecting operation in a state where the cursor position C01 in the display 100 is maintained. A range which has the cursor position C01 as a start point of a range to be selected according to the selecting operation and the cursor position C12 in the text display region D1 at the time of moving the display position of the text display region D1 according to the selecting operation as an end point is assumed to be the selection range by the range selecting unit 331. The information processing apparatus 1 can easily and accurately select the text displayed in the display 100.

Also, the information processing apparatus 1 according to the embodiment detects the changing operation for changing the end point or the start point of the selection range by the changing operation detecting unit 313 in a state where the selection range has been determined. When the changing operation detecting unit 313 has detected the changing operation relative to one of the end point or start point of the selection range, the fourth display position changing unit 324 moves the display position of the text display region D1 in the display 100 and the position of another one in the text display region D1 according to the changing operation in a state where the position of another one in the text display region D1 is maintained. The range changing unit 332 changes the selection range by assuming that one of the start point or end point of the text display region D1 at the time of moving the display position of the text display region D1 according to the changing operation is a position of one side of the selection range. The information processing apparatus 1 can easily and accurately change the selection range of the text displayed in the display 100.

Also, when there is a character, to which the link has been set, in the text display region D1, the information processing apparatus 1 according to the embodiment limits the transition to the link by the transition controlling unit 340 while the moving operation detecting unit 311 detects the moving operation. Accordingly, it is possible for the information processing apparatus 1 not to display the information on the link destination in the display 100 when the moving operation is performed, and the cursor moving processing can be performed without the transition to the link destination.

According to an aspect of the embodiment, it is possible to provide an information processing apparatus, an information display program, and an information display method capable of improving usability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus for editing text, the information processing apparatus comprising:
   a display screen having touch functionality;
   at least one processor; and
   at least one memory storing program instructions for execution by the at least one processor, the at least one processor programmed to cause the display screen to:
      display text having a plurality of characters at a first position of a text display region and a cursor indicating one or more of the characters at a first position of a text display region and a cursor indicating one or more of the characters at a first cursor position of the text display region displayed in the display screen and store the first cursor position of the text display region, wherein the first cursor position in the display screen is a first position expressed by a display coordinate system and a first position expressed by a region coordinate system such that before a moving operation, both of the first positions expressed by the display coordinate system and the region coordinate system for the first cursor position are the same;
      move, from a user by touching the display screen, a display position of the text display region from the first position to a second position of the text display region in the display screen according to the detected moving operation in a state where the first cursor position in the display screen, which is the first position expressed by the display coordinate system, is maintained while the first cursor position, which is the first position expressed by the region coordinate system moves relative to the second position of the second text display region according to the movement of the text display region while detecting the moving operation from the user, and store a second position expressed by the region coordinate system for the second cursor position as the second cursor position in the display screen such that the first and second cursor positions expressed by the display coordinate system are different, and the cursor is moved and positioned at a second cursor position in the text display region to indicate one or more new characters in the second potion of the text display region in the display screen; and
      when the moving operation has been terminated from the user by releasing the touch input from the display screen, return the display position of the text display region from the second position to the first position of the text display region in the display screen, wherein the first position of the text display region is the same display position before the moving operation, and store the second cursor position in the second text display region, which is the second position expressed by the region coordinate system, as the second cursor position in the display screen such that the cursor in the display screen is moved from the first position expressed by the display coordinate system before the moving operation to the second position expressed by the display coordinate system after terminating of the moving operation, and thus the cursor is positioned on the one or more new characters in the second potion of the text display region in the display screen.

2. The information processing apparatus according to claim 1, wherein the processor is further programmed to cause the display screen to:
   limit transition to a link while the moving operation is detected, when there is a character to which the link has been set in the text display region.

3. A non-transitory computer-readable storage medium containing program instructions that, when executed by one or more processors of a computer system, causes the one or more processors to cause a display screen having touch functionality to:
   display text having a plurality of characters at a first position of a text display region and a cursor indicating one or more of the characters at a first position of a text display region and a cursor indicating one or more of the characters at a first cursor position of the text display region displayed in the display screen and store the first cursor position of the text display region, wherein the first cursor position in the display screen is a first position expressed by a display coordinate system and a first position expressed by a region coordinate system such that before a moving operation, both of the first positions expressed by the display coordinate system and the region coordinate system for the first cursor position are the same;
   move, from a user by touching the display screen, a display position of the text display region from the first position to a second position of the text display region in the display screen according to the detected moving operation in a state where the first cursor Position in the display screen, which is the first position expressed by the display coordinate system, is maintained while the first cursor position, which is the first position expressed by the region coordinate system moves relative to the second position of the second text display region according to the movement of the text display region while detecting the moving operation from the user, and store a second position expressed by the region coordinate system for the second cursor position as the second cursor position in the display screen such that the first and second cursor positions expressed by the display coordinate system are different, and the cursor is moved and positioned at a second cursor position in the text display region to indicate one or more new characters in the second potion of the text display region in the display screen; and when the moving operation has been terminated from the user by releasing the touch input from the display screen, return the display position of the text display region from the second position to the first position of the text display region in the display screen, wherein the first position of the text display region is the same display position before the moving operation, and store the second cursor position in the second text display region, which is the second position expressed by the region coordinate system, as the second cursor position in the display screen such that the cursor in the display screen is moved from the first position expressed by the display coordinate system before the moving operation to the second position expressed by the display coordinate system after terminating of the moving operation, and thus the cursor is positioned on the one or more new characters in the second potion of the text display region in the display screen.

4. An information processing method which is performed by a computer, the information processing method comprising:

causing a display screen having touch functionality to:

display text having a plurality of characters at a first position of a text display region and a cursor indicating one or more of the characters at a first position of a text display region and a cursor indicating one or more of the characters at a first cursor position of the text display region displayed in the display screen and store the first cursor Position of the text display region, wherein the first cursor position in the display screen is a first position expressed by a display coordinate system and a first position expressed by a region coordinate system such that before a moving operation, both of the first positions expressed by the display coordinate system and the region coordinate system for the first cursor position are the same;

move, from a user by touching the display screen, a display position of the text display region from the first position to a second position of the text display region in the display screen according to the detected moving operation in a state where the first cursor position in the display screen, which is the first position expressed by the display coordinate system, is maintained while the first cursor Position, which is the first position expressed by the region coordinate system moves relative to the second position of the second text display region according to the movement of the text display region while detecting the moving operation from the user, and store a second position expressed by the region coordinate system for the second cursor position as the second cursor position in the display screen such that the first and second cursor positions expressed by the display coordinate system are different, and the cursor is moved and positioned at a second cursor position in the text display region to indicate one or more new characters in the second potion of the text display region in the display screen; and when the moving operation has been terminated from the user by releasing the touch input from the display screen, return the display position of the text display region from the second position to the first position of the text display region in the display screen, wherein the first position of the text display region is the same display position before the moving operation, and store the second cursor position in the second text display region, which is the second position expressed by the region coordinate system, as the second cursor position in the display screen such that the cursor in the display screen is moved from the first position expressed by the display coordinate system before the moving operation to the second position expressed by the display coordinate system after terminating of the moving operation, and thus the cursor is positioned on the one or more new characters in the second potion of the text display region in the display screen.

* * * * *